INVENTOR
PETER KILCHHOFER

United States Patent Office 3,529,237
Patented Sept. 15, 1970

1

3,529,237
CIRCUIT TESTING OSCILLATOR HAVING AN AUDIBLE OUTPUT AND A PROTECTIVE CONDENSER
Peter Kilchhofer, Liebefeld, Bern, Switzerland, assignor to Elektrische Apparate- und Stanzwerkzeugfabrik E. Schori AG, Bumpliz, Switzerland
Filed Sept. 11, 1967, Ser. No. 666,771
Claims priority, application Germany, Sept. 28, 1966,
E 32,555
Int. Cl. G01r 31/02
U.S. Cl. 324—51
7 Claims

ABSTRACT OF THE DISCLOSURE

A test buzzer having an electronic oscillator, an electro-acoustic transducer connected to the output of the oscillator and at least one test circuit connected to the oscillator input for energizing the oscillator, an audible signal being produced by said transducer when the oscillator is energized through said test circuit, protecting means against over-voltages or over-currents being provided in said test circuit.

---

This invention relates to a test buzzer having a feed-back oscillator, an electro-acoustic transducer connected to the output of the buzzer and a battery adapted to energize said oscillator through a test circuit. In a prior buzzer of this type (British Pat. No. 884,288) the battery, the test circuit and the emitter-collector circuit of a transistor oscillator are directly connected in series. This tester is well adapted for testing circuits without any residual voltages or currents. However, the prior tester is not suited for testing circuits of which it is not entirely sure that they are cut out and free of residual voltages and currents, because the transistor might be damaged or destroyed by over-voltages and/or over-currents from the tested circuit.

This invention relates to a test buzzer of the above type which may be used without any danger of damaging when the circuits to be tested are not absolutely free of over-voltages. The test buzzer according to this invention is broadly characterized by over-voltage and over-current protector means connected into said test circuit and adapted to protect said oscillator from over voltage and over voltage and over current from the circuit to be tested. The protector means may be a simple fuse series connected into the test circuit. However, a resistor having a negative voltage characteristic is preferably connected in parallel with the test circuit for shunting over voltages. With a simple fuse series-connected into the test circuit, damages by over-voltages up to 60 volts may be avoided so that with such a test buzzer weak-current circuits, particularly telephone circuits, may be tested. When an additional alinear over-voltage shunt resistor is connected as stated above, strong-current circuits may be tested because the over-voltage protection is efficient for voltages up to 600 volts.

Other embodiments and objects of this invention will now be described in detail with reference to the accompanying drawings.

2

Figure 6:
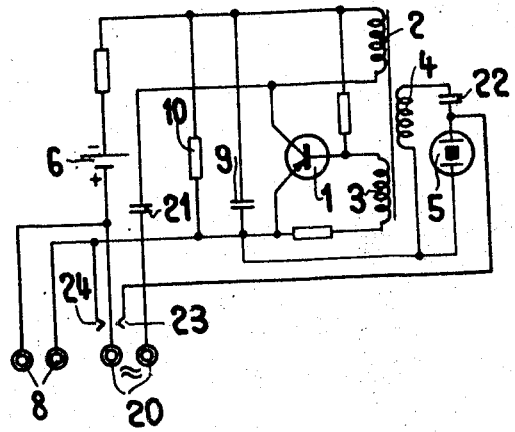

FIG. 6 illustrates a test buzzer with an alternating-current output for testing circuits by means of alternating current.

Figure 1:
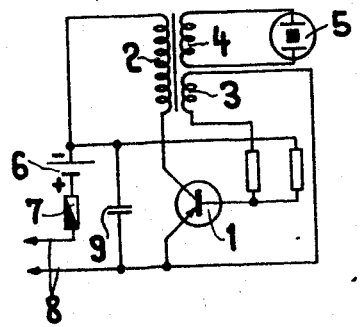
FIG. 1 illustrates a test buzzer with an over-current fuse series-connected into the test circuit.

The test buzzer illustrated in FIG. 1 has a feed-back oscillator including a transistor 1. The primary winding 2 of a feed-back transformer is connected into the collector circuit. The secondary winding 3 is connected into the emitter-base circuit. A second secondary winding 4 energizes an electro-acoustic transducer 5, for instance a piezo-electric cell. The oscillator may be energized from a battery 6 through a fuse 7 and a test circuit 8. A condenser 9 is connected in parallel with the test circuit.

In the rest condition of the test buzzer, that is when the test circuit is broken as illustrated, the whole circuit is deenergized. When the test circuit is closed, the oscillator is energized through the test circuit and starts to oscillate.

The oscillation is applied to the electro-acoustic transducer 5 which indicates by an audible signal that the tested circuit is in order. Possible over-voltages in the tested circuit cannot damage the buzzer and particularly its transistor because the fuse 7 breaks the test circuit before damage may be caused by over-current. The condenser 9 having a relatively high capacity efficiently assists shunting of over-currents and over-voltages which might occur until the fuse 7 breaks the circuit. This condenser has the further purpose to continuously energize the oscillator during testing so that the oscillation and audible signal are not interrupted by accidental transitory interruption of the test circuit at the test contacts, and at the same time over-voltages at the transformer windings 2 to 4 are avoided.

Figure 2:
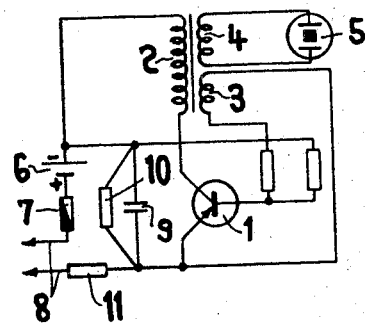
FIG. 2 illustrates a buzzer similar to that shown in FIG. 1 but having an alinear over-voltage shunting resistor.

The test buzzer shown in FIG. 2 substantially corresponds to that of FIG. 1, and similar elements are similarly designated. In the embodiment of FIG. 2 a voltage-dependent shunting resistor 10 is connected in parallel with the test circuit and further a series resistor 11 of about 100 ohms is series-connected into the test circuit. The resistance of resistor 10 decreases with increasing voltage applied to it so that substantial over-voltages which may occur until the fuse 7 breaks the circuit are conducted off. This buzzer may be used for testing strong-current circuits whereby over-voltages up to 600 volts cannot cause any damaging of the circuit.

Figure 3:
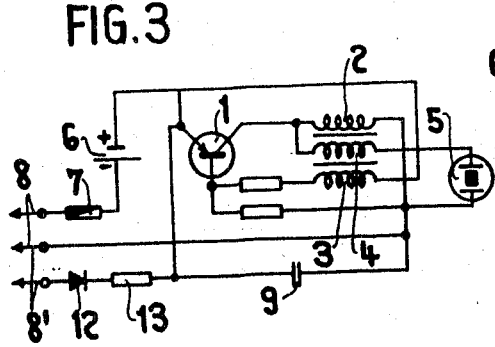
FIG. 3 shows another embodiment of the buzzer with two test circuits.

In the embodment shown in FIG. 3, similar elements are designated as in FIGS. 1 and 2. Except for the test circuit 8 with the battery 6 this instrument has a second test circuit 8' having no battery. A diode 12 and a resistor 13 for instance of 18 kohms are series-connected into this second test circuit. This second test circuit serves for testing direct current circuits and alternating current circuits under voltage whereby the oscillator is energized from the tested circuit. When an alternating-current circuit is tested, the operating current for the oscillator is rectified by the diode 21 and filtered by the condenser 9 and the resistor 13. When a direct-current circuit is tested, the diode 12 also allows testing of the correct polarity of the circuit because the oscillator will only oscillate with the correct polarity.

Figure 4:
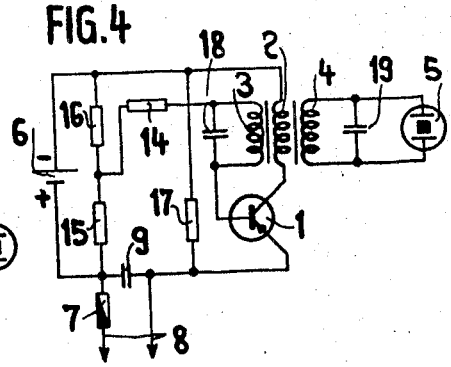
FIG. 4 illustrates an embodiment of the buzzer allowing testing of the resistance of the tested circuit.

In FIG. 4 similar elements are similarly designated as in FIGS. 1 to 3. In the embodiment of FIG. 4 the base of transistor 1 is connected through winding 3 and a resistor 14 to the tapping of a voltage divider consisting of resistors 15 and 16 and connected to the battery 6 so that the base is maintained at a potential determined by the voltage divider 15, 16. The test circuit 8 is connected into the emitter-collector circuit of the transistor. A resistor 17 is connected in parallel with this circuit. This resistor 17 and the test circuit also form a voltage divider connected to the battery by which the voltage of the emitter of the transistor 1 is determined. According to the resistance of the tested circuit the emitter voltage will be higher or lower than the base voltage. With low resistance of the tested circuit the emitter voltage is higher than the base voltage so that the oscillator oscillates. When the resistance of the tested circuit exceeds a determined value, the emitter voltage decreases below the base voltage and the oscillator will no longer oscillate. It is thus possible to determine whether the resistance of the tested circuit exceeds a predetermined value or not. The resistor 17 and/or at least one of resistors 15 and 16 may be variable so that the critical resistance of the tested circuit, for which the oscillator just starts to oscillate may be adjusted. In other words, the resistors 15 to 17 and the test circuit each form one branch of a bridge of which the input is connected to the battery 6 and the output is connected to the base-emitter circuit of transistor 1, whereby the bridge produces a bias voltage for the transistor, the oscillator being operable or inoperable depending on this bias voltage. Hereby the bridge output may be connected to the transistor as desired, that is, the tapping of the voltage divided 15, 16 may be connected to the emitter and the tapping between the resistor 17 and the test circuit may be connected to the base of the transistor. In the latter case, the polarity of the battery should be changed or a complementary transistor should be used when the oscillation shall start for low resistance values in the tested circuit.

The circuit of FIG. 4 has tuning condensers 18 and 19 in the oscillator circuits.

Figure 5:
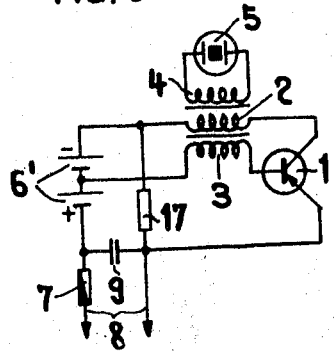
FIG. 5 illustrates a modification of FIG. 4.

FIG. 5 shows a simplified modification of the buzzer according to FIG. 4, wherein similar elements are similarly designated as in FIG. 4. In this case the battery 6' has a middle tapping with which the base of transistor 1 is interconnected through the feed-back winding 3. When the resistance of the tested circuit is low, the emitter of the transistor 1 is positive relatively to the base and the oscillator oscillates. When the resistance of the tested circuit exceeds a predetermined value the emitter potential is below the base potential and the oscillator does not oscillate. Another similar circuit is possible with the emitter connected to the middle tapping of the battery and the base connected between the resistor 17 and the test circuit.

The buzzer shown in FIG. 6 has not only jacks 8 for connection of the usual test circuit, but also jacks 20 for connection of another test circuit. The one jack 20 is connected through a condenser 21 to the collector 23 of the transistor 1. The transducer 5 is energized from winding 4 through a series condenser 22 and the junction between elements 5 and 22 is connected to the one contact 23 of a plug switch. The other contact 24 of the plug switch is connected to the other terminal of the transducer 5.

When the buzzer is used with the test circuit connected to jacks 8 its operation is as described above, whereby the resistor 10 serves for shunting over-voltages. Contacts 23 and 24 are separated so that the transducer 5 is fed by the winding 4.

For testing a circuit with alternating current the test circuit 8 is short-circuited by means of a short-circuit U-link so that the oscillator operates. The plugs of the test cable are inserted into the jacks 20 whereby the contacts 23 and 24 are closed by the one plug whereby the transducer 5 is short circuited and no audible signal is produced. The alternating voltage of the oscillator is fed from the collector of the transistor through condenser 21 to the alternating-current test circuit connected to jacks 20.

What I claim is:

1. A test buzzer comprising a feed-back oscillator, an electro-acoustic transducer connected to the output of said oscillator, a battery for energizing said oscillator, a pair of test terminals between which said oscillator and battery are series connected, said test terminals being adapted for connection to external circuit means to be tested whereby to complete a test circuit from one of said terminals so as to operate said oscillator by current flow in said test circuit upon current flow from said battery through said oscillator and external circuit means connected to said test terminals, said oscillator including a transistor and a transformer having a primary winding series connected with said battery and the emitter-collector circuit of said transistor, and a secondary winding connected to said electro-acoustic transducer, and a protecting condenser connected in parallel with said oscillator into said test circuit, said condenser being connected between said test terminals across said battery whereby said battery and said condenser are in series with the external circuit means when said test terminals are connected to the latter.

2. A test buzzer according to claim 1 including a third test terminal, said oscillator having an input terminal connected to said battery, and a diode connected between said third test terminal and said input terminal.

3. A test buzzer according to claim 2, comprising a resistor series connected with said diode.

4. A test buzzer according to claim 1, comprising alternating-current test terminals connected to the output of the oscillator.

5. A test buzzer according to claim 4, wherein said alternating-current test terminals are jacks for receiving plugs of the test cable, said jacks comprising contacts operable by said plugs for disconnecting said electro-acoustic transducer and for energizing said oscillator.

6. A test buzzer according to claim 1, including a bridge circuit connected to said battery for producing a bias voltage, whereby the oscillator is inoperative when the bias voltage decreases below a predetermined value, the one branch of said bridge circuit being formed between said test terminals.

7. A test buzzer according to claim 1, including a fuse in series between one of said test terminals and said battery.

References Cited

UNITED STATES PATENTS

| | | | |
|---|---|---|---|
| 2,284,423 | 5/1942 | Hansell | 324—132 |
| 2,603,686 | 7/1952 | Lloyd | 324—54 |
| 3,356,939 | 12/1967 | Stevenson | 324—51 |
| 2,010,881 | 8/1935 | Numans | 331—62 XR |
| 2,145,124 | 1/1939 | Mead | 331—62 XR |
| 2,420,857 | 5/1947 | Brown | 331—62 XR |
| 2,762,976 | 9/1956 | Conant | 324—132 |
| 2,946,949 | 7/1960 | Dopheide | 324—51 |
| 2,977,418 | 3/1961 | Haas | 331—112 XR |
| 2,982,881 | 5/1961 | Reich. | |
| 3,032,721 | 5/1962 | Jones | 331—62 |
| 3,051,944 | 8/1962 | Smith | 331—62 XR |
| 3,205,436 | 9/1965 | Donahue | 324—51 |
| 3,284,707 | 11/1966 | Clinton | 324—51 XR |

OTHER REFERENCES

M. H. Patrick, Continuity Checker, Radio Electronics XXXIV # 9, September 1963, p. 47.

Tommy N. Tyler, Continuity Tester Finds Low-Resistance Circuits, Radio-Electronics, pp. 82–83, vol. 37, No. 4, April 1966.

GERALD R. STRECKER, Primary Examiner

U.S. Cl. X.R.

331—62